United States Patent [19]
Watanabe

[11] Patent Number: 4,698,872
[45] Date of Patent: Oct. 13, 1987

[54] WIPER APPARATUS FOR VEHICLES

[75] Inventor: Toshiaki Watanabe, Nakata, Japan

[73] Assignee: Aisin Seiki Kabushiki Kaisha, Kariya, Japan

[21] Appl. No.: 819,050

[22] Filed: Jan. 15, 1986

[30] Foreign Application Priority Data

Jan. 16, 1985 [JP] Japan .................................. 60-006170

[51] Int. Cl.$^4$ ............................................. B60S 1/34
[52] U.S. Cl. .................................................. 15/250.2
[58] Field of Search ............ 15/250.20, 250.19, 250.34

[56] References Cited
U.S. PATENT DOCUMENTS

| 1,697,136 | 1/1929 | Oishei | 15/250.2 |
| 4,370,774 | 2/1983 | Bienert et al. | 15/250.2 |
| 4,439,886 | 4/1984 | Yagasaki et al. | 15/250.34 X |

FOREIGN PATENT DOCUMENTS

| 160637 | 12/1980 | Japan | 15/250.2 |
| 1021131 | 2/1966 | United Kingdom | 15/250.34 |

Primary Examiner—Peter Feldman
Attorney, Agent, or Firm—Finnegan, Henderson, Farabow, Garrett & Dunner

[57] ABSTRACT

A wiper apparatus for vehicles in which the pressing force pressing a wiper blade against a windshield is adjustable. A driving arm oscillates a wiper arm having an attached blade member across the windshield surface. An adjustable bracket is provided on the driving arm. Movement of this bracket moves a biasing spring so as to adjust the pressing force of the wiper blade member against the windshield glass. An adjusting means is operatively connected to the bracket to position the bracket.

8 Claims, 3 Drawing Figures

WIPER APPARATUS FOR VEHICLES

BACKGROUND OF THE INVENTION

1. Field of the Invention

The present invention relates to a wiper apparatus for vehicles and, more particularly, to a wiper apparatus for vehicles in which the pressing force pressing a wiper blade against a window pane is adjustable.

2. Description of the Related Art

As shown in FIG. 3, a conventional wiper apparatus for vehicles is comprised of a wiper blade 6 for wiping the surface of a window pane 6a, a wiper arm 3 rotatably supporting the wiper blade 6 through a pin 3a, and a driving arm 2 connected to the wiper arm 3 through a pivoting pin 5 at one end thereof. The other end of the driving arm 2 (not shown) is operatively connected to a motor 1 for oscillating the wiper arm 3. A tension coil spring 4 disposed between the wiper arm 3 and the driving arm 2 pivots the wiper arm 3 around the pivoting pin 5 to bias the blade 6 towards the front surface of the window pane 6a. The blade 6 wipes the front surface of the window pane 6a when the motor 1 operates the driving arm 2.

Air flows along the front surface of the window pane 6a which lifts the blade 6 against the biasing force of the tension coil spring 4. Further, the velocity of air flow changes in accordance with the vehicle speed. If a weak biasing force tension coil spring 4 is used, the blade 6 will be forced away from the front surface of the window pane at high vehicle speeds and wiping cannot be sufficiently carried out. If a tension coil spring 4 with a strong biasing force tension is used so as to eliminate lifting of the blade 6, the blade 6 is pressed too hard against the front surface of the window pane 6a and chattering may occur at low vehicle speeds.

SUMMARY OF THE INVENTION

Accordingly, it is an object of the invention to provide an improved wiper apparatus for vehicles that does not suffer from the drawbacks of the conventional wiper apparatus discussed above. It is another object of the invention to provide a wiper apparatus in which the pressing force pressing the wiper blade against the window pane is adjustable. It is a further object of the invention to provide a wiper apparatus in which a small driving means is available.

Additional objects and advantages of the present invention will be set forth in part in the description that follows and in part will be obvious from the description or may be learned by practice of the invention. The objects and advantages of the invention may be realized and obtained by the apparatus particularly pointed out in the appended claims.

To achieve the objects and in accordance with the purpose of the invention, as embodied and broadly described herein, the wiper apparatus of this invention comprises a blade member for wiping a vehicle window pane, a wiper arm member supporting the blade, a driving arm means for oscillating the wiper arm member across the surface of the window pane, the driving arm means pivotally connected to the wiper arm, drive means operatively connected to the driving arm for driving said driving arm means so as to oscillate the wiper arm, a movable bracket member movably disposed on the driving arm means, biasing means disposed between the movable bracket member and the wiper arm member so as to force the blade member into contact with the window pane, and an adjusting means operatively connected to the movable bracket member for adjusting the position of the movable bracket member.

The accompanying drawings, which are incorporated in and constitute a part of this specification, illustrate embodiments of the invention and, together with the description, serve to explain the principles of the invention.

DESCRIPTION OF THE PREFERRED EMBODIMENT

Figure 1:
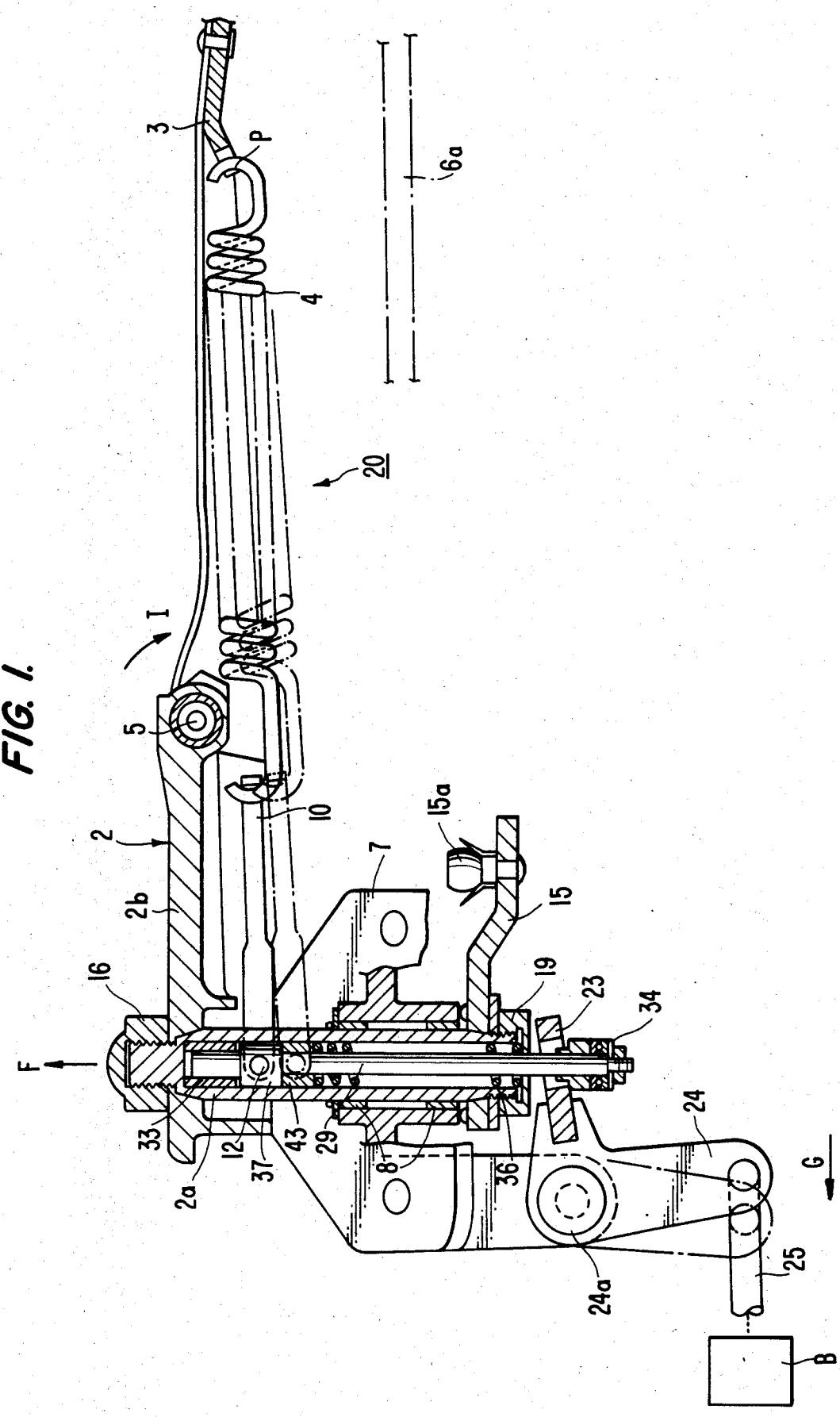
FIG. 1 shows a partial cross sectional view of a wiper apparatus for wiping a vehicle window pane constructed according to a first embodiment of the invention.

Reference will now be made in detail to presently preferred embodiments of the invention, examples of which are illustrated in the accompanying drawings. Throughout the drawings, like reference characters are used to designate like elements.

Figure 3:
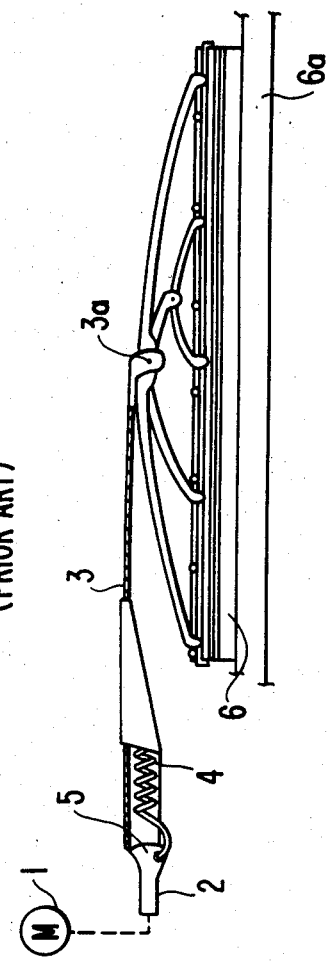
FIG. 3 shows a partial cross sectional view of a conventional wiper apparatus for vehicles.

Now referring to FIG. 1, the wiper apparatus for wiping a vehicle window pane is represented generally by the numeral 20, and, includes according to the present invention, a blade member for wiping the vehicle window pane. As embodied herein, the wiper apparatus 20 has a blade (not shown) made of elastic materials such as rubber and the blade is arranged to be in contact with the front surface of a window pane 6a of a front vehicle window. The central portion of the blade is preferably rotatably supported by an upper side or end (not shown) of a wiper arm 3 through a pin (not shown) in the manner of the conventional wiper apparatus of FIG. 3 showing blade 6 connected to arm 3 through pin 3a. The blade is always positioned so as to be parallel to the surface of the window pane 6a.

In accordance with the present invention, a driving arm means for angularly oscillating the wiper arm is provided. As embodied herein, a driving arm 2 is formed in an L-shape and is comprised of an upper arm 2b and a cylindrical lower arm 2a. The lower arm 2a is preferably rotatably supported in a body bracket 7 through a pair of ring bearings 8 around the peripheral surface thereof. One end of the lower arm 2a passes through the upper arm 2b at the lower end of the upper arm 2b, and the lower arm 2a is fixed to the upper arm 2b by the engagement between a threaded portion thereof and a nut 16. The other end of the lower arm 2a passes through one end of the link 15 and is fixed to the link 15 by the engagement between a threaded portion of the lower arm 2a and a nut 19.

According to the present invention, a drive means, operatively connected to the driving arm means, is provided for driving the driving arm means so as to oscillate the wiper arm member. As embodied herein, the link 15 is operatively connected to a motor (not shown) through a ball joint 15a mounted on the link 15 so as to oscillate the link 15, the lower arm 2a, and the conventional wiper apparatus mentioned above. The upper side of the upper arm 2b is rotatably connected to the lower side or end of the wiper arm 3 through a pivot pin 5 disposed so as to be substantially parallel to the window pane 6a.

Upon energization of the motor, the wiper arm 3 oscillates around the lower arm 2a of the driving arm 2 and the blade wipes the front surface of the window pane 6a.

In accordance with the present invention, a movable bracket member movably disposed on the driving arm means is provided. As embodied herein, a slidable shaft 29 is disposed in the cylindrical lower arm 2a of the driving arm 2, and slidable shaft 29 is slidably supported along the axial direction of the lower arm 2a by ring shaped bearings 33,43. It is preferred that the driving arm means have a hollow cylindrical portion for housing the movable bracket member. It is further preferred that the hollow cylindrical portion be coaxially aligned with the oscillation axis of the driving arm means. A flanged portion 37 is integrally formed on the slidable shaft 29 and arranged between the bearings 33 and 43. A coil spring 36 is disposed between the bearing 43 and the nut 19 and the spring 36 biases the sliding shaft 29 in the direction of arrow F through the bearing 43.

According to the present invention, a biasing means having two ends is disposed between the movable bracket member and the wiper arm member for biasing the wiper arm member towards the window pane. As embodied herein, tension coil spring 4 is disposed between the wiper arm 3 and the slidable shaft 29 so as to bias the wiper arm 3 for rotation around the pin 5 in the direction of arrow H to force the blade into contact with the window pane 6a. The open end of the spring 4 is engaged with the wiper arm 3 at point P, and the other spring end is engaged with a link 10 which is pivotally mounted on the flanged portion of the slidable shaft 29 through a pin 12.

According to the present invention, there is provided an adjusting means operatively connected to the movable bracket member for adjusting the position of the movable bracket member. As embodied herein, the slidable shaft 29 extends beyond the base of the lower arm 2a and a bearing 34 is mounted on the extended portion of the slidable shaft 29. An L-shaped lever 24 is rotatably mounted on the body bracket 7 through a pin 24a. One end of the lever 24 is fixedly connected to a connecting ring 23 into which the extended portion of the slidable shaft 29 is inserted. The bearing 34 disposed on the shaft 29 is engageable with the connecting ring 23. The other end of the lever 24 engages one end of a rod 25. The other of the rod 25 is connected to an adjusting actuator B that is adapted to pull and push the rod 25 along the direction of arrow G to change the position of the rod 25. An operating switch (not shown), disposed in the vehicle passenger compartment, is operatively connected to the actuator B. The body bracket 7 is fixedly mounted on a vehicle body (not shown).

In operation of the wiper apparatus 20, when the blade does not wipe the window pane sufficiently due to airflow caused by high vehicle speeds, the operating switch is actuated to change the angular position of the blade relative to the window pane. When the operating switch is actuated, the rod 25 is caused to move by actuator B in the direction of arrow G, and the lever 24 rotates around the pin 24a. The slidable shaft 29, because of the force exerted by ring 23, slides in the direction opposite that of arrow F. The connecting link 10 and the coil spring 4 are rotated slightly in a counterclockwise direction with respect to the engaging point P, between the wiper arm 3 and the coil spring 4, as shown by the broken-line view. With this rotation, the angle between the coil spring 4 and the wiper arm 3 increases such that the rotation moment of inertia around the pin 5 also increases, and the wiper arm 3 and the blade are more firmly pressed against the front surface of the window pane 6a. This added pressure causes the blade to sufficiently wipe the window pane.

When the rod 25 moves in the direction opposite that shown by arrow G upon actuation of the operating switch, the rotational moment of inertia around the pin 5 decreases, and the wiper arm 3 and the blade experience decreased pressure with respect to the window pane.

Figure 2:
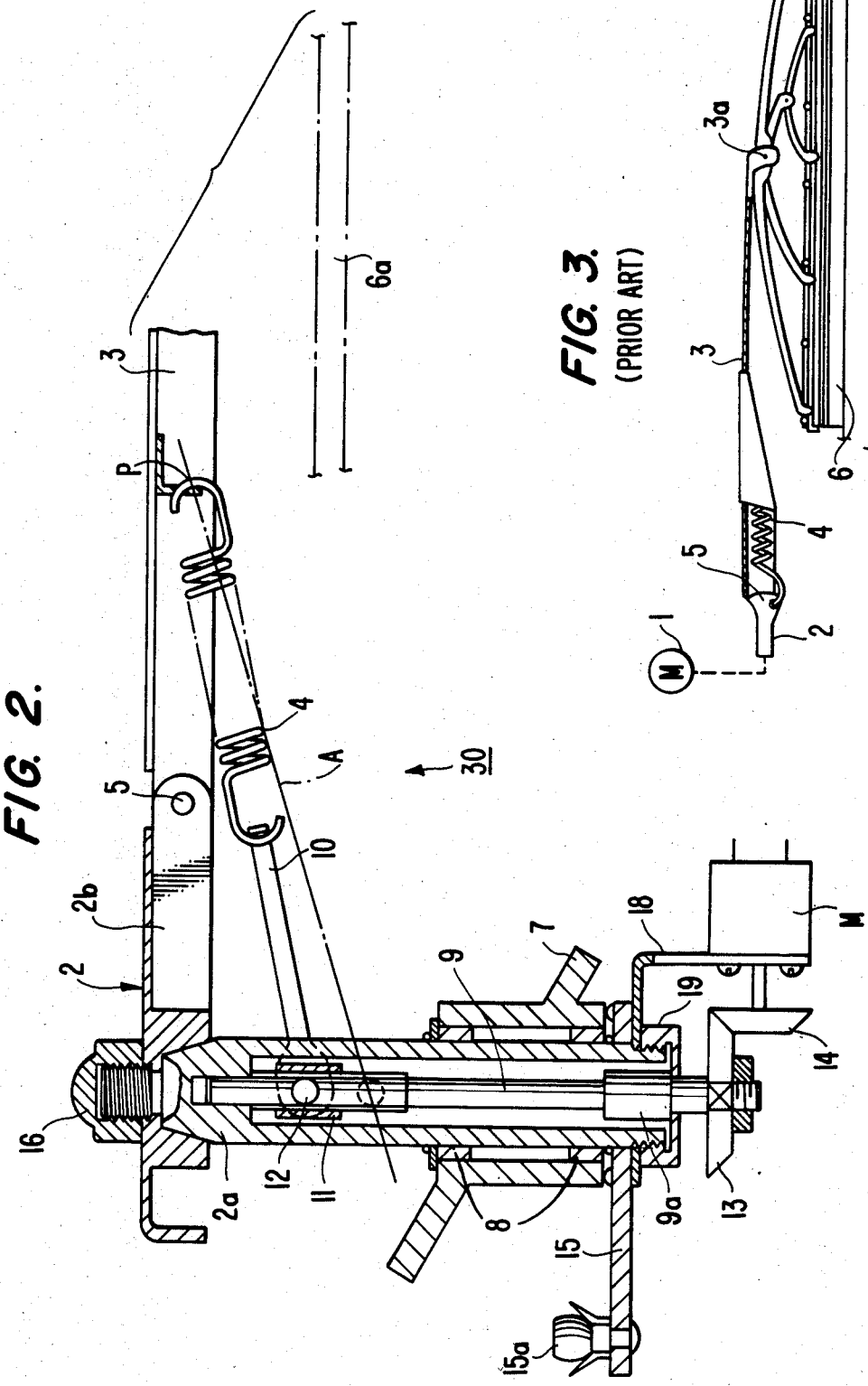
FIG. 2 shows a partial cross sectional view of a wiper apparatus constructed according to a second embodiment of the invention.

According to a second embodiment as shown in FIG. 2, which includes a wiper apparatus 30 constructed similar to the above first embodiment, a cylindrical lower arm 2a of a driving arm 2 has a threaded shaft 9 and a nut 11 threaded on the threaded portion 9a thereof. The threaded shaft 9 is rotatably supported by a boss portion of the lower arm 2a at one end thereof and by a nut 19 fixedly threaded on the lower arm 2a at the other end. The other end of the threaded shaft 9 has an enlarged portion 9a, and this enlarged portion 9a is engaged with the nut 19 by a flange, for example, so that the sliding movement of the threaded shaft 9 is arrested.

The threaded shaft 9 extends beyond the lower arm 2a, and a gear 13 is fixedly mounted thereon. The gear 13 is engaged with another gear 14 operatively connected to a motor M. The motor M is mounted on the bracket 18 fixed on the lower arm 2a. The nut 11 threaded on threaded shaft 9 is connected to the link 10 through the pin 12.

A manual switch (not shown) disposed in the vehicle passenger compartment is electrically connected to the motor M so as to actuate the motor M.

When the motor M is energized by the operation of the manual switch, the threaded shaft 9 is rotated by the motor M via the gears 14,13. When the shaft 9 is rotated, the nut 11 slides downwardly along the threaded shaft 9, and the link 10 and coil spring 4 rotate in a counterclockwise direction around the engaging point P, between the coil spring 4 and the wiper arm 3, as shown by broken line A and by the first embodiment (FIG. 1) discussed above. With this rotation, the angle between the coil spring 4 and the wiper arm 3 increases such that the rotational moment of inertia around the pin 5 also increases, and the wiper arm 3 and the blade are more firmly pressed against the window pane 6a. Since the rotational moment of inertia around the pin 5 increases in a continuous manner in contrast to a stepped movement, fine adjustment is possible with the invention according to this second embodiment.

If the motor M is rotated in the opposite direction, the rotational moment of inertia rotation around the pin 5 decreases and the pressure of the wiper arm 3 and the blade against the window pane 6a also decreases.

The rotational moment inertia around the pin 5 is adjusted by the rotation of the coil spring 4 around the engaging point P, between the coil spring 4 and the wiper arm 3, to change the angle between the coil spring 4 and the wiper arm 3 in the above mentioned embodiments. The load on the coil spring 4 never substantially changes, only the spring angle changes. Also, the sliding force applied to slide shaft 29 of the first embodiment or the rotating force applied to threaded shaft 9 of the second embodiment for changing the spring angle is not large so that the motor M may be small in size. Also, large mechanical strength in the slide shaft 29 or the threaded shaft 9 is not required.

The wiper apparatus according to the invention is also applicable to the vehicle rear window.

It will be apparent to those skilled in the art that modifications and variations can be made in the wiper apparatus of this invention. The invention in its broader aspects is, therefore, not limited to the specific details, representative apparatus, and illustrative examples shown and described hereinabove. Thus, it is intended that all matter contained in the foregoing description or shown in the accompanying drawings shall be interpreted as illustrative and not in a limiting sense.

What is claimed is:

1. A wiper apparatus for wiping a vehicle window pane comprising:
    a blade member for wiping the vehicle window pane;
    a wiper arm member having a longitudinal axis extending between opposite first and second ends, said first end of said arm member supporting said blade member;
    driving arm means for oscillating said wiper arm member across the surface of said window pane, said driving arm means being pivotally connected to said second end of said wiper arm member;
    drive means, operatively connected to said driving arm means for driving said driving arm means so as to oscillate said wiper arm member;
    a movable bracket member disposed on said driving arm means;
    an elongated link member having first and second opposite ends, said first end of said link member pivotally connected to said movable bracket;
    elongated biasing means having a first end pivotally connected to said wiper arm member and a second end connected adjacent said second end of said link member for imparting a biasing force on said wiper arm towards said window pane so as to force said blade member into contact with said window pane, said elongated biasing means having a longitudinal axis coaxially disposed relative to a longitudinal axis of said elongated link member, said longitudinal axes forming a selected angle with the longitudinal axis of said wiper arm member in accordance with the position of the bracket pivot; and
    adjusting means operatively connected to said movable bracket member for moving said bracket relative to said arm member for varying said selected angle to alter the angle of the biasing force imparted on said wiper arm by said biasing means.

2. A wiper apparatus according to claim 1 wherein said biasing means is a spring.

3. A wiper apparatus according to claim 1 wherein said driving arm means has a hollow cylindrical portion for housing said movable bracket member.

4. A wiper apparatus according to claim 3 wherein said movable bracket member includes a shaft slidably disposed in said hollow cylindrical portion of said driving arm member and wherein said adjusting means slidably moves said shaft for adjusting the position thereof.

5. A wiper apparatus according to claim 3 wherein said movable bracket member is comprised of a threaded shaft rotatably disposed in said hollow cylindrical portion of said driving arm, said threaded shaft having a nut meshed thereon and being connected to the second end of said biasing member, and wherein said adjusting means is rotatably connected to said threaded shaft for rotating said threaded shaft to move said nut along the axis of said shaft.

6. The wiper apparatus according to claim 3 wherein said hollow cylindrical portion is coaxially aligned with the oscillation axis of said driving arm means.

7. A wiper apparatus for wiping a vehicle window pane comprising:
    a blade member for wiping the vehicle window pane;
    a wiper arm member having a longitudinal axis extending between opposite first and second ends, said first end of said arm member supporting said blade member;
    driving arm means for oscillating said wiper arm across the surface of said window pane, said driving arm means being pivotally connected to said second end of said wiper arm member;
    a shaft disposed on said driving arm means, said shaft being axially slidable and substantially perpendicular to said wiper arm member;
    elongated biasing means having a first end pivotally connected to said wiper arm member and a second end pivotally connected to said slidable shaft for imparting a biasing force on said wiper arm towards said window pane so as to force said blade member into contact with said window pane, said elongated biasing means having a longitudinal axis forming a selected angle with the longitudinal axis of said wiper arm member in accordance with the position of the shaft pivot; and
    adjusting member operatively connected to said slidable shaft for sliding the shaft pivot relative to said arm member for varying the selected angle to alter the angle of the biasing force imparted on said wiper arm by said biasing means.

8. A wiper apparatus for wiping a vehicle window pane comprising:
    a blade member for wiping the vehicle window pane;
    a wiper arm member having a longitudinal axis extending between opposite first and second ends, said first end of said arm member supporting said blade member;
    driving arm means for oscillating said wiper arm across the surface of said window pane, said driving arm means being pivotally connected to said second end of said wiper arm member;
    a threaded shaft rotatably disposed on said driving arm member, said threaded shaft being substantially perpendicular to said wiper arm member;
    a nut member threaded on said shaft;
    elongated biasing means having a first end pivotally connected to said wiper arm member and a second end pivotally connected to said nut member for imparting a biasing force on said wiper arm towards said window pane so as to force said blade member into contact with said window pane, said elongated biasing means having a longitudinal axis forming a selected angle with the longitudinal axis of said wiper arm member in accordance with the position of the nut member pivot; and
    adjusting member operatively connected to said rotatable shaft for rotating said shaft to move said nut member in an axial direction for moving the nut member pivot relative to said arm member for varying the selected angle to alter the angle of the biasing force imparted on said wiper arm by said biasing means.

* * * * *